(12) United States Patent
Tang et al.

(10) Patent No.: US 10,448,124 B2
(45) Date of Patent: Oct. 15, 2019

(54) METHOD AND SYSTEM FOR ISSUING MEDIA INFORMATION

(71) Applicant: Tencent Technology (Shenzhen) Company Limited, Shenzhen (CN)

(72) Inventors: Xiliu Tang, Shenzhen (CN); Jie Yi, Shenzhen (CN); Zuowei Chen, Shenzhen (CN); Jiliang Li, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/944,660

(22) Filed: Apr. 3, 2018

(65) Prior Publication Data
US 2018/0227647 A1 Aug. 9, 2018

Related U.S. Application Data

(63) Continuation-in-part of application No. PCT/CN2017/071324, filed on Jan. 16, 2017.

(30) Foreign Application Priority Data

Jan. 18, 2016 (CN) .......................... 2016 1 0032982

(51) Int. Cl.
G06Q 30/02 (2012.01)
G06F 17/30 (2006.01)
(Continued)

(52) U.S. Cl.
CPC ............ H04N 21/84 (2013.01); G06F 16/00 (2019.01); G06Q 30/00 (2013.01); H04H 60/06 (2013.01);
(Continued)

(58) Field of Classification Search
CPC .............. G06Q 30/02; G06Q 30/0277; G06Q 30/0241; G06Q 30/0251; G06Q 30/0242;
(Continued)

(56) References Cited

U.S. PATENT DOCUMENTS 6,493,721 B1   12/2002  Getchius et al.
2014/0298381 A1* 10/2014 Koyama ................. H04N 5/76
                                                725/32

FOREIGN PATENT DOCUMENTS

CN    102339315 A    2/2012
CN    103957464 A    7/2014
(Continued)

OTHER PUBLICATIONS

Tencent Technology, ISR, PCT/CN2017/071324, May 2, 2017, 2 pgs.
(Continued)

Primary Examiner — Hsiungfei Peng
Assistant Examiner — Fred Peng
(74) Attorney, Agent, or Firm — Morgan, Lewis & Bockius LLP

(57) ABSTRACT

The present disclosure provides a method and system for issuing media information, including: obtaining a listing of changed media information that is in an unprocessed state, including identification information of a target changed field for pre-configured target media information, and original field content information and new field content information of the target changed field for the pre-configured target media information; updating the pre-configured target media information based on the new field content information of the target changed field; receiving a request for the pre-configured target media information from a media subscription client; and in response to receiving the request for the pre-configured target media, issuing the updated pre-con-
(Continued)

figured target media information to a media subscription client, wherein the media subscription client displays the updated pre-configured target media information in lieu of the pre-configured target media information.

15 Claims, 3 Drawing Sheets

(51) Int. Cl.
    *H04N 21/20* (2011.01)
    *H04N 21/234* (2011.01)
    *H04N 21/81* (2011.01)
    *H04N 21/84* (2011.01)
    *G06F 16/00* (2019.01)
    *G06Q 30/00* (2012.01)
    *H04H 60/73* (2008.01)
    *H04H 60/06* (2008.01)

(52) U.S. Cl.
    CPC ...... *H04H 60/73* (2013.01); *H04N 21/23424* (2013.01); *H04N 21/812* (2013.01)

(58) Field of Classification Search
    CPC ........... G06Q 30/0271; G06Q 30/0276; H04N 21/812; H04N 1/00244; H04N 1/00344
    See application file for complete search history.

(56) References Cited

FOREIGN PATENT DOCUMENTS

| | | |
|---|---|---|
| CN | 104301762 A | 1/2015 |
| CN | 104636943 A | 5/2015 |
| CN | 105718550 A | 6/2016 |

OTHER PUBLICATIONS

Tencent Technology, Written Opinion, PCT/CN2017/071324, dated May 2, 2017, 5 pgs.
Tencent Technology, IPRP, PCT/CN2017/071324, Jul. 24, 2018, 6 pgs.

\* cited by examiner

METHOD AND SYSTEM FOR ISSUING MEDIA INFORMATION

PRIORITY CLAIM AND RELATED APPLICATION

This application is a continuation-in-part application of PCT/CN2017/071324, entitled "MEDIA INFORMATION PUBLISHING METHOD, SYSTEM AND COMPUTER STORAGE MEDIUM" filed on Jan. 16, 2017, which claims priority to Chinese Patent Application No. 201610032982.1, filed with the State Intellectual Property Office of the People's Republic of China on Jan. 18, 2016, and entitled "MEDIA INFORMATION PUBLISHING METHOD, SYSTEM AND COMPUTER STORAGE MEDIUM", both of which are incorporated herein by reference in their entirety.

FIELD OF THE TECHNOLOGY

The present disclosure relates to information management technologies of servers, and in particular, to a method and system for issuing media information.

BACKGROUND OF THE DISCLOSURE

In the industry, companies, such as Google, Baidu, Alibaba, and Facebook, all have mature data issuance systems for issuing media content to the public, but there are few public technical documents describing the inner workings of the data issuance systems. Usually, when media information, particularly, advertisement data, is issued, strong service logic (e.g., hardcoded program logic) is used for implementation, and when a field in the media information is to be modified (e.g., per the need of the content owner), media issuance data can be generated only by obtaining complete field information. However, if media information is issued by using the foregoing solution, an operation can be performed only on the content in a fixed field, and variable requirements during the media information issuance cannot be satisfied.

SUMMARY

In view of this, a main objective of embodiments of the present technology is to provide a method and system for issuing media information to at least address the foregoing technical problem that currently exists.

To achieve the foregoing objective, technical solutions of the present disclosure are implemented as follows:

The embodiments of the present technology provide a method for issuing media information, including:

obtaining by detection a listing of changed media information satisfying a preset condition, the listing of changed media information at least including identification information of a changed field for the media information, and the preset condition representing that the listing of changed media information is in an unprocessed state;

obtaining field content information corresponding to a target changed field based on the identification information of the changed field in the listing of changed media information and a content information list of the media information, the content information list of the media information at least including the identification information of the changed field and field content information corresponding to the changed field; and updating the target media information based on the field content information corresponding to the target changed field, and issuing the updated target media information.

By means of a method and system for issuing media information provided by the present disclosure, a listing of changed media information in an unprocessed state may be obtained by detection, identification information of a changed field for target media information is obtained from the listing of changed media information; and the target media information is updated based on the identification information of the changed field, and the updated target media information is issued. In this way, by obtaining by detection a listing of changed media information in an unprocessed state, perceiving a change of the media information in real time is ensured. In addition, because the solution provided by the embodiments of the present technology is updating a field in the media information, which is not directly related to service logic of the media information, the field in the media information may be directly processed, thereby ensuring smooth expansion and satisfying flexible and variable requirements raised on the media information according to actual situations.

DESCRIPTION OF EMBODIMENTS

The present technology is further described below in further detail with reference to the accompanying drawings and specific embodiments.

Embodiment 1

Figure 1:
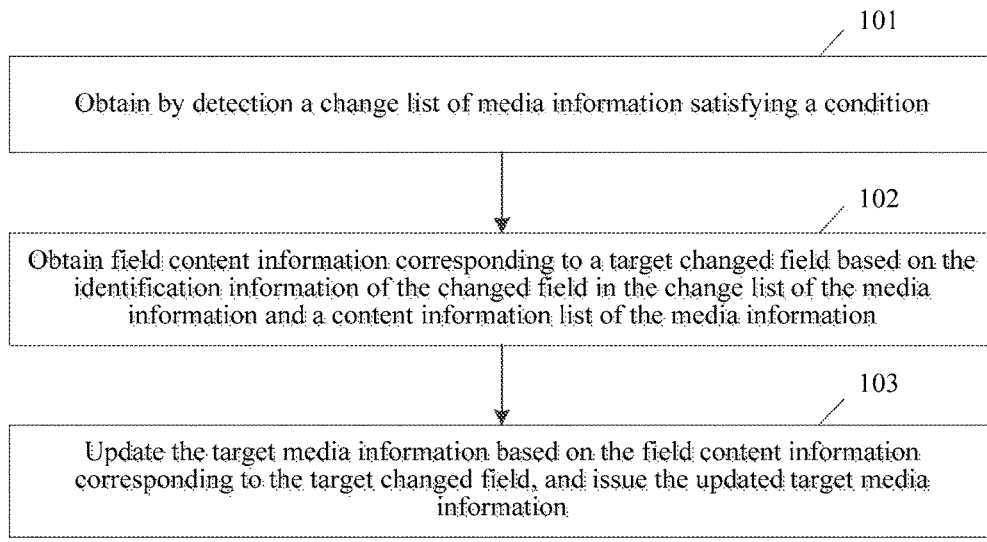
FIG. 1 is a flowchart of a method for issuing media information according to an embodiment of the present technology.

An embodiment of the present technology discloses a method for issuing media information, as shown in FIG. 1, including the following steps:

Step 101: Obtain by detection a listing of changed media information satisfying a preset condition, the listing of changed media information at least including identification information of a changed field for the media information, and the preset condition representing that the listing of changed media information is in an unprocessed state.

Step 102: Obtain field content information corresponding to a target changed field based on the identification information of the changed field in the listing of changed media information and a content information list of the media information, the content information list of the media information at least including the identification information of the changed field and field content information corresponding to the changed field.

Step 103: Update the target media information based on the field content information corresponding to the target changed field, and issue the updated target media information.

Herein, the media information may be advertisement data.

For a scenario in which media information is advertisement data in this embodiment, the method may include: when changing advertisement data, writing a changed field into an advertisement change flow table, and generating an advertisement change flow ID by means of a strictly ascending sequence number service; periodically requesting, by an advertisement subscriber, for the sequence number service, obtaining a maximum flow ID in a system and processing an advertisement flow, generating complete advertisement data, and performing data distribution. The distribution may be distributing the advertisement data to an index unit or an index apparatus to generate an advertisement index, and data issuance is performed based on the index unit, in some embodiments.

Main advantages are: taking effect in real time, and perceiving an advertisement data change timely, so that either addition of a new advertisement or a modification to an inventory advertisement can take effect as soon as possible; and defining advertisement data independently of service logic, so that smooth expansion can be implemented to satisfy variable requirements of an advertisement system.

In general, this solution may include a stage of performing setting for a changed field of media information and a stage of updating the media information based on the set changed field. In this embodiment, the stage of how to perform setting for a changed field of media information is mainly described as follows:

determining to update field content information in the media information, where the media information includes at least one field; and generating a listing of changed media information based on identification information corresponding to the updated field.

The determining to update field content information in the media information may be that the media information includes at least one field, and it may be determined to update one of the fields, or it may be determined to update two or more of the fields.

The generating a listing of changed media information may include: generating a listing of changes for the media information according to identification information of the updated field, where specifically, a name of the updated field is added to the listing of changed media information; or generating a listing of changes for the media information according to identification information and specific content of the updated field, where specifically, the listing of changed media information may include a name and updated specific content corresponding to the field.

Further, based on the generating a list of changes of the media information, the list of changes may further include: setting a serial number for the listing of changed media information based on a serial number of a historical list of changes saved in a system.

A specific operation manner of the sequentially setting a serial number may include: in a system of a server, generating a serial number in ascending order for a historical list of changes of each piece of media information; for a currently generated list of changes of the media information, obtaining a serial number corresponding to a previous historical change list; adding one to the previous serial number to obtain a serial number corresponding to the currently generated list of changes of the media information; and then, adding the obtained serial number to the change list.

Detailed description is performed by using an example, in which media information is advertisement data: an advertisement data change is a modification performed by an advertiser or an advertisement system to an advertisement field. When advertisement data is changed, in addition to modifying an advertisement data table, an advertisement change flow table, namely, a change list, also needs to be modified, and specific content before the modification and specific content after the modification corresponding to a modification field are recoded in the flow table. A serial number in the advertisement change flow table may be generated by means of a strictly ascending sequence number service. By setting the serial number, the advertisement subscriber may conveniently detect whether there is an unprocessed advertisement change. An advertisement change flow may simply record a changed field list or record content of the changed field before and after the modification in detail.

In view of this, by using the foregoing solution, a listing of changed media information in an unprocessed state may be obtained by detection, identification information of a changed field for target media information is obtained from the listing of changed media information; and the target media information is updated based on the identification information of the changed field, and the updated target media information is issued. In this way, by obtaining by detection a listing of changed media information in an unprocessed state, perceiving a change of the media information in real time is ensured. In addition, because the solution provided by the embodiment of the present technology is updating a field in the media information, which is not directly related to service logic of the media information, the field in the media information may be directly processed, thereby ensuring smooth expansion and satisfying flexible and variable requirements raised on the media information according to actual situations.

An embodiment of the present technology discloses a method for issuing media information, as shown in FIG. 1, including the following steps:

Step 101: Obtain by detection a listing of changed media information satisfying a preset condition, the listing of changed media information at least including identification information of a changed field for the media information, and the preset condition representing that the listing of changed media information is in an unprocessed state.

Step 102: Obtain field content information corresponding to a target changed field based on the identification information of the changed field in the listing of changed media information and a content information list of the media information, the content information list of the media information at least including the identification information of the changed field and field content information corresponding to the changed field.

Step 103: Update the target media information based on the field content information corresponding to the target changed field, and issue the updated target media information.

Herein, the media information may be advertisement data.

For a scenario in which media information is advertisement data in this embodiment, the method may include: when changing advertisement data, writing a changed field into an advertisement change flow table, and generating an advertisement change flow ID by means of a strictly ascending sequence number service; periodically requesting, by an advertisement subscriber, for the sequence number service, obtaining a maximum flow ID in a system and processing an advertisement flow, generating complete advertisement data, and performing data distribution. Main advantages are: taking effect in real time, and perceiving an advertisement data change timely, so that either addition of a new advertisement or a modification to an inventory advertisement can take effect as soon as possible; and defining advertisement data independently of service logic, so that smooth expansion can be implemented to satisfy variable requirements of an advertisement system.

In general, this solution may include a stage of performing setting for a changed field of media information and a stage of updating the media information based on the set changed field. In this embodiment, the stage of how to perform setting for a changed field of media information is first described as follows:

determining to update a field in the media information, where the media information includes at least one field; and generating a listing of changed media information based on the field.

The determining to update a field in the media information may be that the media information includes at least one field, and it may be determined to update one of the fields, or it may be determined to update two or more of the fields.

The generating a listing of changed media information may include: generating a listing of changes for the media information according to a name of the updated field, where specifically, a name of the updated field is added to the listing of changed media information; or generating a listing of changes for the media information according to a name and specific content of the updated field, where specifically, the listing of changed media information may include a name and updated specific content corresponding to the field.

Further, on the basis of the generating a list of changes of the media information, the list of changes may further include: setting a serial number for the listing of changed media information based on a serial number of a historical list of changes saved in a system.

A specific operation manner of the setting a serial number may include: in a system of a server, generating a serial number in ascending order for a historical list of changes of each piece of media information; for a currently generated list of changes of the media information, obtaining a serial number corresponding to a previous historical change list; adding one to the previous serial number to obtain a serial number corresponding to the currently generated list of changes of the media information; and then, adding the obtained serial number to the change list.

Detailed description is performed by using an example, in which media information is advertisement data: an advertisement data change is a modification performed by an advertiser or an advertisement system to an advertisement field. When advertisement data is changed, in addition to modifying an advertisement data table, an advertisement change flow table, namely, a change list, also needs to be modified, and specific content before the modification and specific content after the modification corresponding to a modification field are recoded in the flow table. A serial number in the advertisement change flow table may be generated by means of a strictly ascending sequence number service. By setting the serial number, the advertisement subscriber may conveniently detect whether there is an unprocessed advertisement change. An advertisement change flow may simply record a changed field list or record content of the changed field before and after the modification in detail.

Based on the aforementioned solution, processing in the stage of updating the media information based on the set changed field is further described in this embodiment:

The obtaining by detection a listing of changed media information satisfying a preset condition includes:

obtaining a currently recorded maximum serial number corresponding to a list of changes that has been processed;

obtaining a serial number of the listing of changed media information; and determining whether the serial number of the listing of changed media information is greater than the maximum serial number, if the serial number of the listing of changed media information is greater than the maximum serial number, determining that the listing of changed media information satisfies the preset condition, and otherwise, determining that the listing of changed media information does not satisfy the preset condition.

The obtaining a currently recorded maximum serial number corresponding to a list of changes that has been processed may include: every time the server processes a change list, recording a serial number corresponding to the change list; and obtaining all serial numbers corresponding to all currently processed change lists, and selecting a maximum serial number from all of the serial numbers.

Because serial numbers of change lists of the media information are generated by the server in ascending order, if the maximum serial number corresponding to the change lists that has been processed currently is smaller than a serial number of a currently obtained change list, it indicates that the obtained list of changes of the media information is an unprocessed change list.

That is, the server maintains a flow list that has been processed, and periodically requests for a sequence number service to obtain a currently maximum flow ID, and if finding that the maximum flow ID is greater than a flow ID that has been processed, starts to process a flow.

Further, the obtaining field content information corresponding to a target changed field based on the identification information of the changed field in the listing of changed media information and a content information list of the media information includes:

determining whether the changed fields are all target changed fields of subscription based on the identification information corresponding to the changed field and a subscription view list of the media information; and obtaining field content information corresponding to the target changed fields from the content information list of the media information if the changed fields are all target changed fields of subscription, where the subscription view list of the media information includes at least one subscription list, and each of the subscription list is directed to a field in the media information.

It should be noted that in addition to including identification information of a changed field and field content information corresponding to the changed field, the content information list of the media information in this embodiment may include identification information of an unchanged field and field content information corresponding to the unchanged field. That is, the content information list of the media information includes all content of the media information.

In the foregoing solution, the subscription list may be used for defining data included in target media information, and moreover, each piece of target media information may correspond to a plurality of subscription lists, and the plurality of subscription lists constitute a subscription view for the target media information.

Specifically, the subscription list may at least include the following content: a field name of subscription, a list linkage relationship with another subscription list of the target media information, and a condition that valid field content needs to satisfy.

In addition, the subscription view of the target media information is defined independently of service logic, and a field is added when necessary. That is, a subscription list may be added to a subscription view to satisfy variable requirements of an advertisement system.

When field content information of a target changed field is obtained, the following processing may be further included:

The field content information of the target changed field is filtered based on a condition that a field of target media information in the subscription list needs to satisfy, and a field that satisfies the condition that the field needs to satisfy and that is obtained after the filtration is used as field content information of the selected target changed field. Further, content of the target media information is updated based on the field content information of the target changed field.

It should be noted herein that in this embodiment, the update may be adding new content to the target media information or deleting content from the target media information. A condition that the field needs to satisfy may include at least one of the following: a specified field cannot be deleted or added and a field of specified content cannot be deleted or added.

That is, when media information is an advertisement, a content information list of the media information may be an advertisement data table, correspondingly, a listing of changed media information may be used as an advertisement change flow table, and subscription lists may constitute a subscription view for the advertisement, which specifically includes:

when processing an advertisement change flow table, first requesting for the advertisement change flow table to obtain a changed field list, and comparing the changed field list with a subscription view list to check whether there is a view that uses a changed field. If there is a view that uses a changed field, processing is performed, and expansion is started from a changed table until all tables of the view are completely expanded, and then data storage and distribution.

In view of this, by using the foregoing solution, a listing of changed media information in an unprocessed state may be obtained by detection, identification information of a changed field for target media information is obtained from the listing of changed media information; and the target media information is updated based on the identification information of the changed field, and the updated target media information is issued. In this way, by obtaining by detection a listing of changed media information in an unprocessed state, perceiving a change of the media information in real time is ensured. In addition, because the solution provided by the embodiment of the present technology is updating a field in the media information, which is not directly related to service logic of the media information, the field in the media information may be directly processed, thereby ensuring smooth expansion and satisfying flexible and variable requirements raised on the media information according to actual situations.

In some embodiments, the method for issuing media information may include two stages, namely, an advertisement data change stage and an advertisement data subscription stage, and technical solutions of the two stages are sequentially described below.

Figure 2:
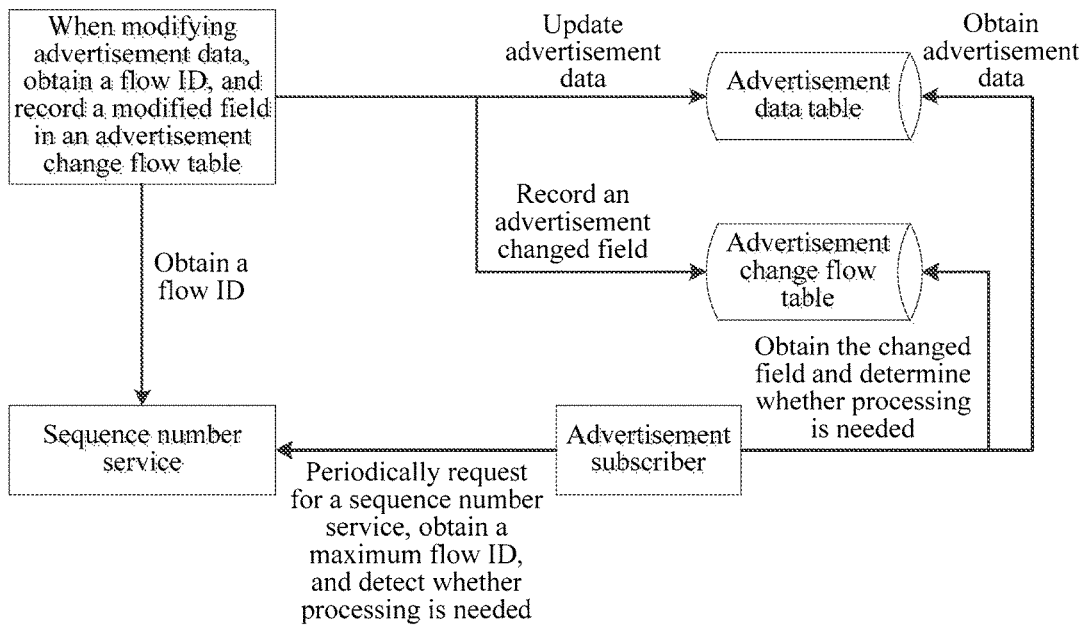
FIG. 2 is a schematic logical block diagram of a method for issuing media information according to an embodiment of the present technology.

FIG. 2 is a diagram of an overall logical architecture. First, processing in the first stage is described with reference to FIG. 2: when advertisement data needs to be modified, specific field content information is added, deleted, or modified in an advertisement data table, a flow ID is obtained, the flow ID in an advertisement change flow table is used as a serial number, and an advertisement changed field is recorded in the advertisement change flow table.

An advertisement data change is a modification performed by an advertiser or an advertisement system to an advertisement field. When advertisement data is changed, in addition to modifying an advertisement data table, an advertisement change flow table, namely, a change list, also needs to be modified, and specific content before the modification and specific content after the modification corresponding to a modification field are recoded in the flow table. A serial number in the advertisement change flow table may be generated by means of a strictly ascending sequence number service. By setting the serial number, the advertisement subscriber may conveniently detect whether there is an unprocessed advertisement change. An advertisement change flow may simply record a changed field list or record content of the changed field before and after the modification in detail.

Figure 3:
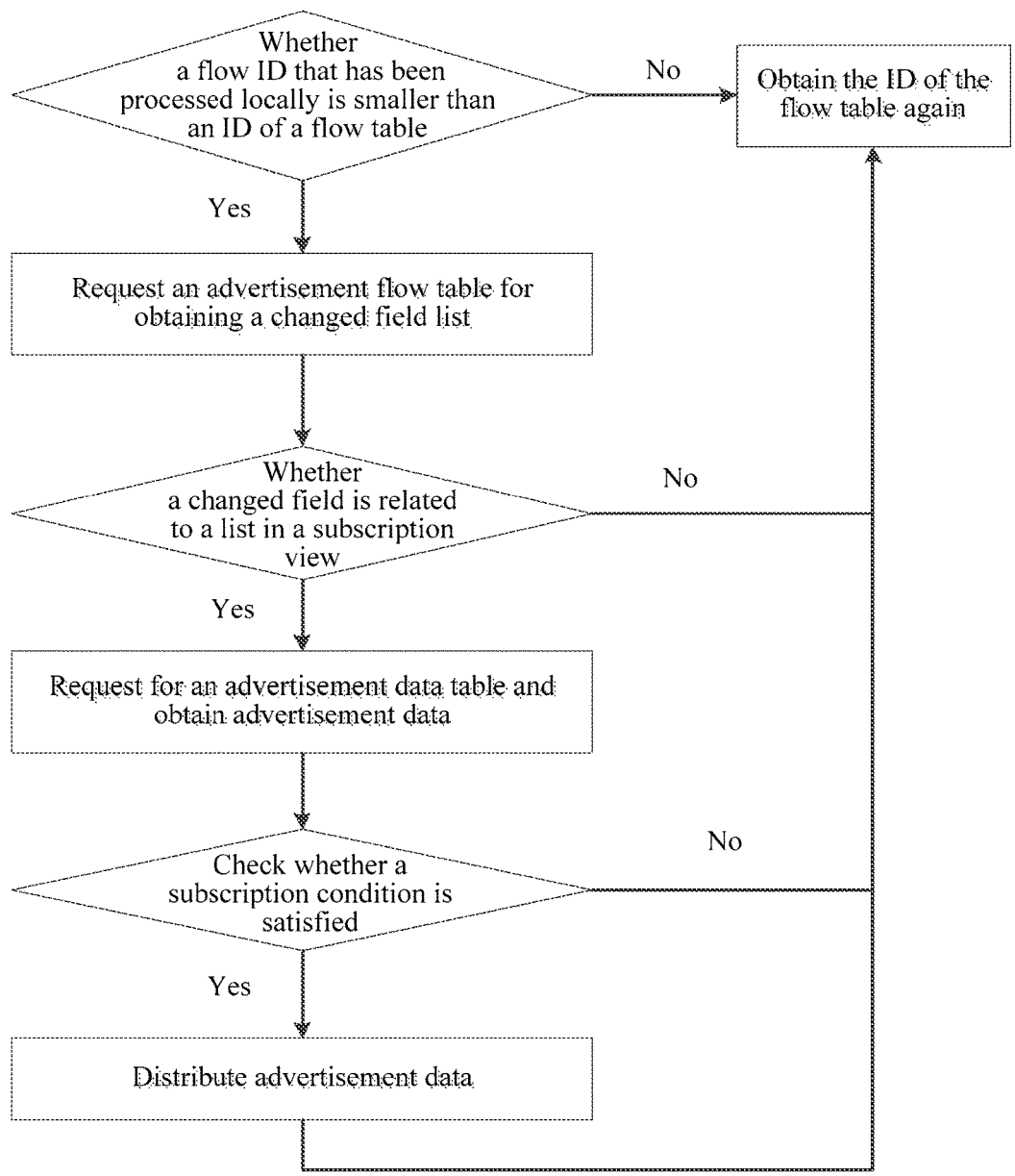
FIG. 3 is a flowchart of a preferred embodiment of a method for issuing media information according to an embodiment of the present technology.

An operation of issuing advertisement subscription in the second stage is described with reference to FIG. 2 and FIG. 3:

An advertisement subscriber locally maintains a flow list that has been processed, and periodically requests for a sequence number service to obtain a currently maximum flow ID, and if finding that the maximum flow ID is greater than a flow ID that has been processed, starts to process a flow, that is, the advertisement change flow table. An advertisement change flow table is first requested when processing a flow, to obtain a changed field list, and the changed field list is compared with a subscription view list to check whether there is a view that uses a changed field. If there is a view that uses a changed field, processing is performed, and expansion is started from a changed table until all tables of the view are completely expanded, and then data storage and distribution. Further, after specific advertisement data of the changed field is obtained based on the subscription view, it is determined whether the advertisement data satisfies a subscription condition, and if the advertisement data satisfies the subscription condition, the advertisement data is updated and issued.

The subscription list may be used for defining data included in target media information, and moreover, each piece of target media information may correspond to a plurality of subscription lists, and the plurality of subscription lists constitute a subscription view for the target media information. Specifically, the subscription list may at least include the following content: a field name of subscription, a list linkage relationship with another subscription list of the target media information, and a condition that valid field content needs to satisfy.

In addition, the subscription view of the target media information is defined independently of service logic, and a field is added when necessary, or a subscription list may be added to a subscription view to satisfy variable requirements of an advertisement system.

Preferably, based on the foregoing solution, in this embodiment, it may also be set that when advertisement data is updated at a relatively low frequency, a database auto-increment field is used as a serial number generator.

Alternatively, when advertisement data is updated at a relatively high frequency, an independent sequence number service with higher throughput needs to be used.

In addition, for setting the subscription view, when an advertisement data volume is small, a database does not need to be partitioned into libraries or tables, and an SQL statement may be used as a definition of the subscription view; and when the advertisement data volume is large, the database needs to be partitioned into libraries or tables, a simple SQL statement is insufficient for defining the subscription view, and the subscription view may be defined by using an XML- or protocol buffer-based configuration.

Based on the above, in some embodiments, a method for issuing media information (e.g., advertisement or other media information that has a pre-configured format and that is dynamically generated based on information retrieved from a content database), comprising: at a server comprising one or more processors and memory: obtaining a listing of changed media information that is in an unprocessed state, the listing of changed media information comprising identification information of a target changed field for pre-configured target media information, and original field content information and new field content information of the target changed field for the pre-configured target media information; updating the pre-configured target media information based on the new field content information of the target changed field, including: generating the target media information in accordance with pre-stored field content information and pre-programmed media information generation logic for the pre-configured target media information; in accordance with the listing of change media information, identifying the original field content information of the target changed field in the pre-configured target media information that has been generated; in accordance with the listing of changed media information, replacing the original field content information of the target changed field in the pre-configured target media information that has been generated with the new field content information of the target changed field; receiving a request for the pre-configured target media information from a media subscription client; and in response to receiving the request for the pre-configured target media, issuing the updated pre-configured target media information to a media subscription client, wherein the media subscription client displays the updated pre-configured target media information in lieu of the pre-configured target media information.

In some embodiments, prior to obtaining the listing of changed media information that is in the unprocessed state: the server receives media information update request from a content provider associated with the pre-configured target media information, the media information update request specifying the identification information of the target changed field for the pre-configured target media information, and the original field content information and the new field content information of the target changed field for the pre-configured target media information; the server generates the listing of changed media information based on the media information update request received from the content provider; the server obtains a serial number for the listing of changed media information from a serial number generator, wherein the serial number generator generates the serial number for each newly received media information update request by incrementing on a respective serial number generated for a historic media information update request that immediately preceded said each newly received media information update request; and the server assigns the obtained serial number to the listing of changed media information.

In some embodiments, prior to updating the pre-configured target media information based on the new field content information of the target changed field: the server retrieves a currently recorded maximum serial number that corresponds to a respective listing of media information changes that has been processed; and the server determines that the listing of changed media information is in the unprocessed state in accordance with a determination that the serial number of the listing of changed media information is greater than a currently recorded maximum serial number.

In some embodiments, the listing of changed media information further comprises identification information of a new target field for the pre-configured target media information, wherein the new target field does not exist in the pre-configured target media information, and wherein the listing of changed media information further includes field content information of the new target field.

In some embodiments, the listing of changed media information further comprises identification information for a location of the new target field in the updated pre-configured target media. In some embodiments, the method further include: further updating the pre-configured target media information based on the field content information of the new target field, including: after the target media information has been generated in accordance with the pre-stored field content information and the pre-programmed media information generation logic for the pre-configured target media information, inserting the field content information of the new target field at the location in the updated pre-configured target media in accordance with the identification information for the location of the new target field in the pre-configured target media information that has been generated and updated.

Other details of the method are described with respect to other embodiments set forth herein.

Figure 4:
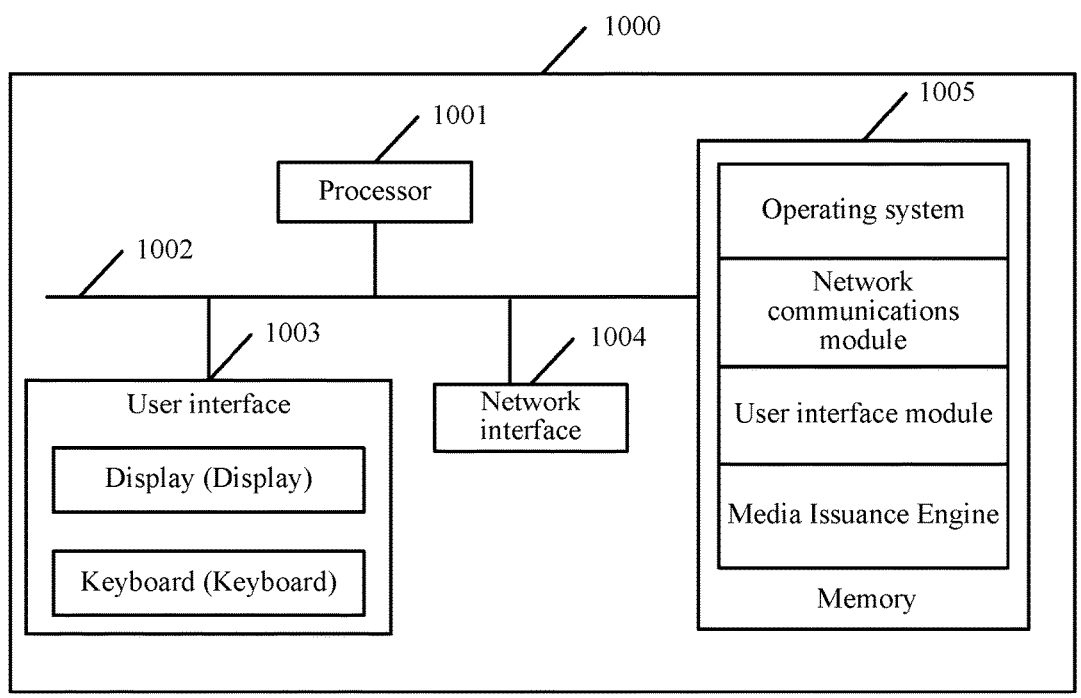
FIG. 4 is a first schematic diagram of a composition structure of a server according to an embodiment of the present technology.

Referring to FIG. 4, FIG. 4 is a schematic structural diagram of a server for issuing media information according to an embodiment of this application. As shown in FIG. 4, the server 1000 may include at least one processor 1001, for example, a CPU, at least one network interface 1004, a user interface 1003, a memory 1005, and at least one communications bus 1002. The communications bus 1002 is configured to implement connection and communication between the components. The user interface 1003 may include a display, and a keyboard. Optionally, the user interface 1003 may further include a standard wired interface and a wireless interface. The network interface 1004 may, optionally, include a standard wired interface and a wireless interface (for example, a Wi-Fi interface). The memory 1005 may be a high-speed random access memory (RAM), or may be a non-volatile memory, for example, at least one magnetic disk memory. Optionally, the memory 1005 may also be at least one storage device located away from the processor 1001. As shown in FIG. 4, as a computer storage medium, the memory 1005 may include an operating system, a network communications module, a user interface module, and a media issuance engine.

In the server 1000 shown in FIG. 4, the network interface 1004 is mainly configured to connect to a client and/or other servers, and perform data communication with the client and/or other servers. The user interface 1003 is mainly configured to provide an interface for inputting by a user, and obtain data output by the user. The processor 1001 may be configured to invoke the media issuance engine stored in the memory 1005, and specifically perform the methods described herein.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What is disclosed above is merely example embodiments of this application, and certainly is not intended to limit the protection scope of this application. Therefore, equivalent variations made in accordance with the claims of this application shall fall within the scope of this application.

What is claimed is:

1. A method for issuing media information, wherein the media information is advertisement data, the method comprising: at a server comprising one or more processors and memory: receiving a media information update request from a content provider associated with pre-configured target media information, the media information update request specifying identification information of a target changed field for the pre-configured target media information, and original field content information and new field content information of the target changed field for the pre-configured target media information; generating, from a content database associated with the server, a listing of changed media information in an unprocessed state based on the media information update request received from the content provider, wherein the content database has a plurality of tables for storing the changed media information; obtaining a serial number for the listing of changed media information from a serial number generator, wherein the serial number generator generates the serial number for each newly received media information update request by incrementing on a respective serial number generated for a historic media information update request that immediately preceded said each newly received media information update request; assigning the obtained serial number to the listing of changed media information; updating the pre-configured target media information based on the new field content information of the target changed field, including:

generating, using pre-programmed media information generation logic within the memory of the server, the pre-configured target media information in accordance with pre-stored field content information within the content database;

in accordance with the listing of change media information, identifying, within a respective table of the content database, the original field content information of the target changed field in the pre-configured target media information that has been generated;

in accordance with the listing of changed media information, replacing the original field content information of the target changed field in the pre-configured target media information that has been generated with the new field content information of the target changed field;

receiving a request for the pre-configured target media information from a media subscription client; and in response to receiving the request for the pre-configured target media information, issuing the updated pre-configured target media information to a media subscription client, wherein the media subscription client displays the updated pre-configured target media information in lieu of the pre-configured target media information.

2. The method according to claim 1, including:
prior to updating the pre-configured target media information based on the new field content information of the target changed field:

retrieving a currently recorded maximum serial number that corresponds to a respective listing of media information changes that has been processed; and determining that the listing of changed media information is in the unprocessed state in accordance with a determination that the serial number of the listing of changed media information is greater than a currently recorded maximum serial number.

3. The method according to claim 1, wherein the listing of changed media information further comprises identification information of a new target field for the pre-configured target media information, wherein the new target field does not exist in the pre-configured target media information, and wherein the listing of changed media information further includes field content information of the new target field.

4. The method according to claim 1, wherein the listing of changed media information further comprises identification information for a location of the new target field in the updated pre-configured target media.

5. The method according to claim 4, including:
further updating the pre-configured target media information based on the field content information of the new target field, including:

after the pre-configured target media information has been generated in accordance with the pre-stored field content information and the pre-programmed media information generation logic for the pre-configured target media information, inserting the field content information of the new target field at the location in the updated pre-configured target media in accordance with the identification information for the location of the new target field in the pre-configured target media information that has been generated and updated.

6. A server for issuing media information, wherein the media information is advertisement data, the server comprising:

one or more processors; and memory storing instructions, which when executed by the one or more processors, cause the processors to perform operations comprising:

receiving a media information update request from a content provider associated with pre-configured target media information, the media information update request specifying identification information of a target changed field for the pre-configured target media information, and original field content information and new field content information of the target changed field for the pre-configured target media information;

generating, from a content database associated with the server, a listing of changed media information in an unprocessed state based on the media information update request received from the content provider, wherein the content database has a plurality of tables for storing the changed media information;

obtaining a serial number for the listing of changed media information from a serial number generator, wherein the serial number generator generates the serial number for each newly received media information update request by incrementing on a respective serial number generated for a historic media information update request that immediately preceded said each newly received media information update request;

assigning the obtained serial number to the listing of changed media information;

updating the pre-configured target media information based on the new field content information of the target changed field, including:
  generating, using pre-programmed media information generation logic within the memory of the server, the pre-configured target media information in accordance with pre-stored field content information within the content database;
  in accordance with the listing of change media information, identifying, within a respective table of the content database, the original field content information of the target changed field in the pre-configured target media information that has been generated;
  in accordance with the listing of changed media information, replacing the original field content information of the target changed field in the pre-configured target media information that has been generated with the new field content information of the target changed field;
receiving a request for the pre-configured target media information from a media subscription client; and
in response to receiving the request for the pre-configured target media information, issuing the updated pre-configured target media information to a media subscription client, wherein the media subscription client displays the updated pre-configured target media information in lieu of the pre-configured target media information.

7. The server according to claim 6, wherein the operations further include:
  prior to updating the pre-configured target media information based on the new field content information of the target changed field:
    retrieving a currently recorded maximum serial number that corresponds to a respective listing of media information changes that has been processed; and
    determining that the listing of changed media information is in the unprocessed state in accordance with a determination that the serial number of the listing of changed media information is greater than a currently recorded maximum serial number.

8. The server according to claim 6, wherein the listing of changed media information further comprises identification information of a new target field for the pre-configured target media information, wherein the new target field does not exist in the pre-configured target media information, and wherein the listing of changed media information further includes field content information of the new target field.

9. The server according to claim 6, wherein the listing of changed media information further comprises identification information for a location of the new target field in the updated pre-configured target media.

10. The server according to claim 9, wherein the operations include:
  further updating the pre-configured target media information based on the field content information of the new target field, including:
    after the pre-configured target media information has been generated in accordance with the pre-stored field content information and the pre-programmed media information generation logic for the pre-configured target media information, inserting the field content information of the new target field at the location in the updated pre-configured target media in accordance with the identification information for the location of the new target field in the pre-configured target media information that has been generated and updated.

11. A non-transitory computer-readable storage medium for issuing media information, wherein the media information is advertisement data, storing instructions, which when executed by one or more processors, cause the processors to perform operations comprising:
  receiving a media information update request from a content provider associated with pre-configured target media information, the media information update request specifying identification information of a target changed field for the pre-configured target media information, and original field content information and new field content information of the target changed field for the pre-configured target media information;
  generating, from a content database associated with the server, a listing of changed media information in an unprocessed state based on the media information update request received from the content provider, wherein the content database has a plurality of tables for storing the changed media information;
  obtaining a serial number for the listing of changed media information from a serial number generator, wherein the serial number generator generates the serial number for each newly received media information update request by incrementing on a respective serial number generated for a historic media information update request that immediately preceded said each newly received media information update request;
  assigning the obtained serial number to the listing of changed media information;
  updating the pre-configured target media information based on the new field content information of the target changed field, including:
    generating, using pre-programmed media information generation logic within the memory of the server, the pre-configured target media information in accordance with pre-stored field content information within the content database;
    in accordance with the listing of change media information, identifying, within a respective table of the content database, the original field content information of the target changed field in the pre-configured target media information that has been generated;
    in accordance with the listing of changed media information, replacing the original field content information of the target changed field in the pre-configured target media information that has been generated with the new field content information of the target changed field;
  receiving a request for the pre-configured target media information from a media subscription client; and
  in response to receiving the request for the pre-configured target media information, issuing the updated pre-configured target media information to a media subscription client, wherein the media subscription client displays the updated pre-configured target media information in lieu of the pre-configured target media information.

12. The non-transitory computer-readable storage medium according to claim 11, wherein the operations further include:
  prior to updating the pre-configured target media information based on the new field content information of the target changed field:

retrieving a currently recorded maximum serial number that corresponds to a respective listing of media information changes that has been processed; and determining that the listing of changed media information is in the unprocessed state in accordance with a determination that the serial number of the listing of changed media information is greater than a currently recorded maximum serial number.

13. The non-transitory computer-readable storage medium according to claim 11, wherein the listing of changed media information further comprises identification information of a new target field for the pre-configured target media information, wherein the new target field does not exist in the pre-configured target media information, and wherein the listing of changed media information further includes field content information of the new target field.

14. The non-transitory computer-readable storage medium according to claim 11, wherein the listing of changed media information further comprises identification information for a location of the new target field in the updated pre-configured target media.

15. The non-transitory computer-readable storage medium according to claim 14, wherein the operations include:

further updating the pre-configured target media information based on the field content information of the new target field, including:

after the pre-configured target media information has been generated in accordance with the pre-stored field content information and the pre-programmed media information generation logic for the pre-configured target media information, inserting the field content information of the new target field at the location in the updated pre-configured target media in accordance with the identification information for the location of the new target field in the pre-configured target media information that has been generated and updated.

\* \* \* \* \*